US008146085B2

(12) United States Patent
Duffy et al.

(10) Patent No.: US 8,146,085 B2
(45) Date of Patent: *Mar. 27, 2012

(54) CONCURRENT EXCEPTION HANDLING USING AN AGGREGATED EXCEPTION STRUCTURE

(75) Inventors: John Joseph Duffy, Renton, WA (US); David Callahan, Seattle, WA (US); David Detlefs, Westford, WA (US); Vance Morrison, Kirkland, WA (US); Brian Grunkemeyer, Redmond, WA (US); Eric Dean Tribble, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1107 days.

This patent is subject to a terminal disclaimer.

(21) Appl. No.: 11/821,647

(22) Filed: Jun. 25, 2007

(65) Prior Publication Data

US 2008/0320275 A1  Dec. 25, 2008

(51) Int. Cl.
G06F 9/46 (2006.01)
G06F 7/38 (2006.01)

(52) U.S. Cl. .................................. 718/100; 712/244
(58) Field of Classification Search .................. 718/100; 712/244
See application file for complete search history.

(56) References Cited

U.S. PATENT DOCUMENTS

| 5,241,675 | A | 8/1993 | Sheth et al. |
| 5,305,455 | A | 4/1994 | Anschuetz et al. |
| 5,335,343 | A | 8/1994 | Lampson et al. |
| 5,369,570 | A | 11/1994 | Parad |
| 5,701,480 | A | 12/1997 | Raz |
| 6,009,517 | A * | 12/1999 | Bak et al. ........................ 712/245 |
| 6,081,665 | A * | 6/2000 | Nilsen et al. ................... 717/116 |
| 6,216,222 | B1 | 4/2001 | Hinds et al. |
| 6,378,067 | B1 | 4/2002 | Golliver et al. |
| 6,393,386 | B1 | 5/2002 | Zager et al. |
| 6,629,098 | B2 * | 9/2003 | Mc George, Jr. ...................... 1/1 |
| 6,754,737 | B2 | 6/2004 | Heynemann et al. |
| 6,785,779 | B2 | 8/2004 | Berg et al. |
| 6,883,172 | B1 * | 4/2005 | Angeline et al. .............. 719/315 |
| 7,020,879 | B1 | 3/2006 | Nemirovsky et al. |
| 7,089,253 | B2 | 8/2006 | Hinshaw et al. |
| 7,158,973 | B2 * | 1/2007 | Mandal et al. ......................... 1/1 |
| 7,203,926 | B2 | 4/2007 | Bogle et al. |
| 7,240,186 | B2 | 7/2007 | Bell et al. |
| 7,500,252 | B1 * | 3/2009 | Angeline et al. .............. 719/330 |
| 7,522,516 | B1 | 4/2009 | Parker |

(Continued)

FOREIGN PATENT DOCUMENTS

WO  2005006106 A2  1/2005

OTHER PUBLICATIONS

Rintala, "Handling Multiple Concurrent Exceptions in C++ Using Futures", Advanced Topics in Exception Handling Techniques Lecture Notes in Computer Science, LNCS, Springer, Berlin, Germany, Jan. 1, 2006, 20 pages.

(Continued)

Primary Examiner — Van Nguyen

(57) ABSTRACT

Various technologies and techniques are disclosed for providing concurrent exception handling. Exceptions that occur in concurrent workers are caught. The caught exceptions are then forwarded from the concurrent workers to a coordination worker. The caught exceptions are finally aggregated into an aggregation structure, such as an aggregate exception object. This aggregation structure is rethrown and the individual caught exceptions may then be handled at a proper time.

17 Claims, 10 Drawing Sheets

U.S. PATENT DOCUMENTS

| | | | |
|---|---|---|---|
| 7,526,761 | B2 | 4/2009 | Ogasawara |
| 7,607,125 | B2* | 10/2009 | Shinnar et al. ............... 717/140 |
| 7,836,428 | B2* | 11/2010 | Mitchell et al. .............. 717/117 |
| 2002/0029299 | A1 | 3/2002 | Kappel et al. |
| 2002/0095406 | A1* | 7/2002 | Mc George, Jr. ................ 707/3 |
| 2003/0115276 | A1 | 6/2003 | Flaherty et al. |
| 2004/0015642 | A1 | 1/2004 | Moir et al. |
| 2005/0203958 | A1* | 9/2005 | Mitchell et al. ........... 707/104.1 |
| 2006/0112248 | A1 | 5/2006 | Meiri et al. |
| 2006/0190504 | A1 | 8/2006 | Pruet, III |
| 2006/0218206 | A1 | 9/2006 | Bourbonnais et al. |
| 2007/0220370 | A1* | 9/2007 | Branda et al. .................. 714/49 |
| 2008/0127205 | A1* | 5/2008 | Barros .......................... 719/313 |
| 2008/0320291 | A1 | 12/2008 | Duffy et al. |

OTHER PUBLICATIONS

Tazuneki, et al., "Concurrent Exception Handling in a Distributed Object-Oriented Computing Environment", Parallel and Distributed Systems: Workshops, Seventh International Conference on, 2000 Iwate, Japan, Jul. 4-7, 2000, 8 pages.

Xu, et al., "Coordinated Exception Handling in Distributed Object Systems: From Model to System Implementation", Distributed Computing Systems, 1998. Proceedings 18th International Conference on Amsterdam, Netherlands, May 26-29, 1998, 10 pages.

European Search Report for Application No. 08770892.1-2211/2176753, Jun. 28, 2010, 12 pages.

Flanagan, "Java in a Nutshell—Deutsche Ausgabe fur Java 1.1", 1998, 8 pages.

International Search Report and Written Opinion for International Appln. No. PCT/US2008/066777, dated Dec. 1, 2008, 10 pages.

Dony, "Exception Handling and Object-Oriented Programming: towards a synthesis", In Proceedings of the European conference on object-oriented programming on Object-oriented programming systems, languages, and applications, 1990, 9 pages.

Hammond, "Exception Handling in a Parallel Functional Language: PSML", In TENCON '89, Fourth IEEE Region 10 International Conference, 1989, 5 pages.

Dekeyser, et al., "Conflict Scheduling of Transactions on XML Documents", Date: 2004, vol. 27, pp. 1-9.

International Search Report and Written Opinion Received for PCT Application No. PCT/US2008/066775, mailed on Dec. 30, 2008, 10 pages.

Costich Oliver, "Transaction Processing Using an Untrusted Scheduler in a Multilevel Database with Replicated Architecture", pp. 1-17, 1991.

Yeo, et al., "Linear Orderability of Transactions in Mobile Environment with Heterogeneous Databases", downloaded from http://scholar.google.com/scholar?hl=en&lr=&q=cache:sE6pcsZOP6UJ:www.it.swin.edu.au/personal/jhan/jhanPapers/icci96.ps+transaction+commit+linear+order+conflict, on Oct. 19, 2006, Jun. 1996, 30 pages.

Office Action for U.S. Appl. No. 12/948,564 dated Mar. 25, 2011, 13 pages.

Office Action for U.S. Appl. No. 12/948,564 dated Aug. 24, 2011, 8 pages.

* cited by examiner

CONCURRENT EXCEPTION HANDLING USING AN AGGREGATED EXCEPTION STRUCTURE

BACKGROUND

Software programs have been written to run sequentially since the beginning days of software development. In a sequential program, tasks execute one after another, i.e. one task finishes completely first before the next is begun, and if a previous task does not finish subsequent tasks do not execute. Steadily over time computers have become much more powerful, with more processing power and memory to handle advanced operations. This trend has recently shifted away from ever-increasing single-processor clock rates and towards an increase in the number of processors available in a single computer, i.e. away from sequential execution and toward parallel execution. Software developers want to take advantage of improvements in computer processing power, enabling their software programs to run faster as new hardware is adopted. With parallel hardware, however, this requires a different approach: developers must arrange for one or more tasks of a particular software program to be executed "concurrently" (sometimes called "in parallel"), so that the same logical operation can utilize many processors at one time, and deliver better performance as more processors are added to the computers on which such software runs.

Concurrent programs are fundamentally different than sequential ones, because many tasks happen at once instead of one after the other. This raises one particularly difficult problem: whereas in a sequential program, execution of a logical operation stops at the first occurrence of an exception, in concurrent programs exceptions may occur in many tasks at once. Current exception handling mechanisms assume linear, sequential execution, and so communicating such failures to the program presents problems. To make matters worse, the software developer is often working with an application programming interface that gives the appearance of a traditional sequential interface, even though its implementation runs work concurrently, which makes it increasingly difficult to encapsulate the implementation details of an interface when concurrency is used internally.

SUMMARY

Various technologies and techniques are disclosed for providing concurrent exception handling. Exceptions that occur in concurrent tasks are caught and forwarded to a coordination task. These exceptions are then aggregated into an aggregation structure, such as an aggregate exception object, and rethrown by the coordination task. The aggregation structure may then be caught and the individual exceptions inside handled appropriately by the program.

In one implementation, the exceptions are handled in the program once all concurrent tasks have completed. In such an implementation, a coordination task initializes a shared flag and a shared list of exceptions to be aggregated. Concurrent worker tasks are started, and should one throw an exception, the shared flag is set and the exception is added to the shared list. All worker tasks poll the flag to determine whether it has been set; when they see that it has been set, they voluntarily terminate. If any additional exceptions occur on concurrent tasks before they are able to voluntarily terminate, those further exceptions are also added to the shared list. Once all of the concurrent worker tasks terminate, an aggregate exception object is created by the coordination task containing references to each of the exceptions in the shared list and then the aggregate exception is thrown by the coordination task.

In another implementation, when the concurrent work is spawned, one or more exception handler descriptors are supplied: each such descriptor is comprised of an exception type and a handler function. For each respective exception that occurs on a given concurrent worker task, the task determines if the respective exception type is of a kind of handled by the one or more exception handler functions provided. If the respective exception is of such a type, then the particular handler function is run and the exception is considered handled. Any exceptions that remain unhandled are then processed in the manner described above.

In one implementation, a sequential process is provided that uses concurrent worker tasks, with a collection of input data being processed to produce a corresponding collection of output results. The exceptions are interleaved alongside non-exceptional output results. The collection of output results is made available to the sequential process. The worker tasks continue to produce the output results completely, as exceptions are encountered. This technique defers the evaluation of exceptions, permitting them to be handled during the consumption of the results rather than as part of the production of said output results.

In another implementation, a single particular exception is selected that represents the multiple exceptions, leading to only one exception being thrown out of the coordination task. This is used when many homogeneous exceptions are caught and/or when a clear preference can be determined by the system.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
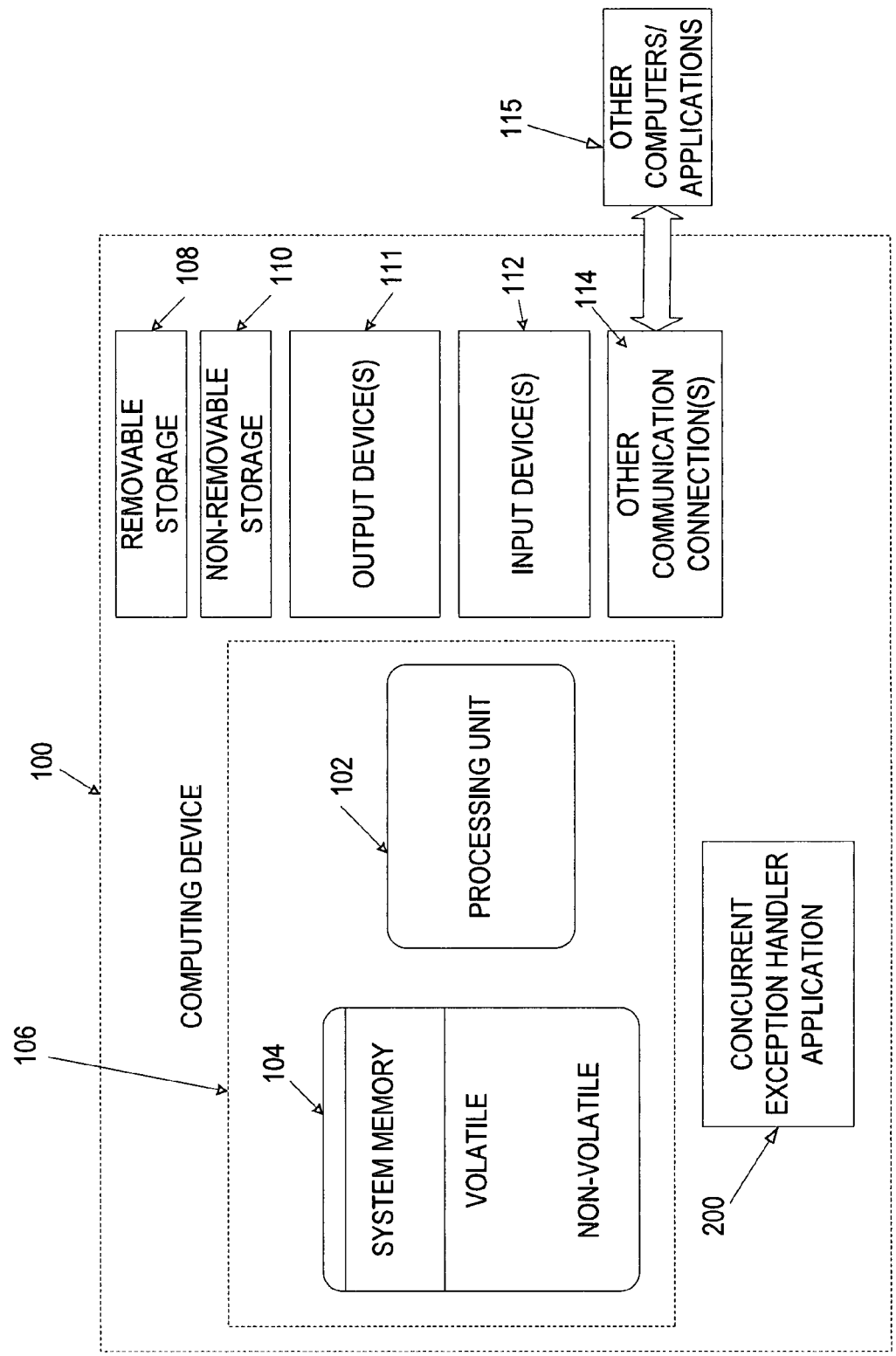
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that provides concurrent exception handling, but the system also serves other purposes in addition to these. In one implementation, one or more of the techniques described herein can be implemented as features within a framework program such as MICROSOFT®.NET Framework, or from any other type of program or service that handles concurrent exceptions occurring in programs.

In one implementation, a concurrent exception handling system is provided that can manage exceptions that occur concurrently on many worker tasks. The exceptions can be handled in various ways and at various times, such as by aggregating exceptions and throwing from a coordination task after all concurrent worker tasks finish, such as placing exceptions interleaved among non-exceptional data in the output stream for deferred handling, and so on. The term "task" as used herein means a logical unit of work which may or may not result in an independent thread. The term "coordination task" as used herein means a task that is responsible for coordinating multiple worker tasks. The term "worker task" as used herein means a task that is responsible for carrying out one or more particular logical units of work associated with a higher level program operation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes concurrent exception handling application 200. Concurrent exception handling application 200 will be described in further detail in FIG. 2.

Figure 2:
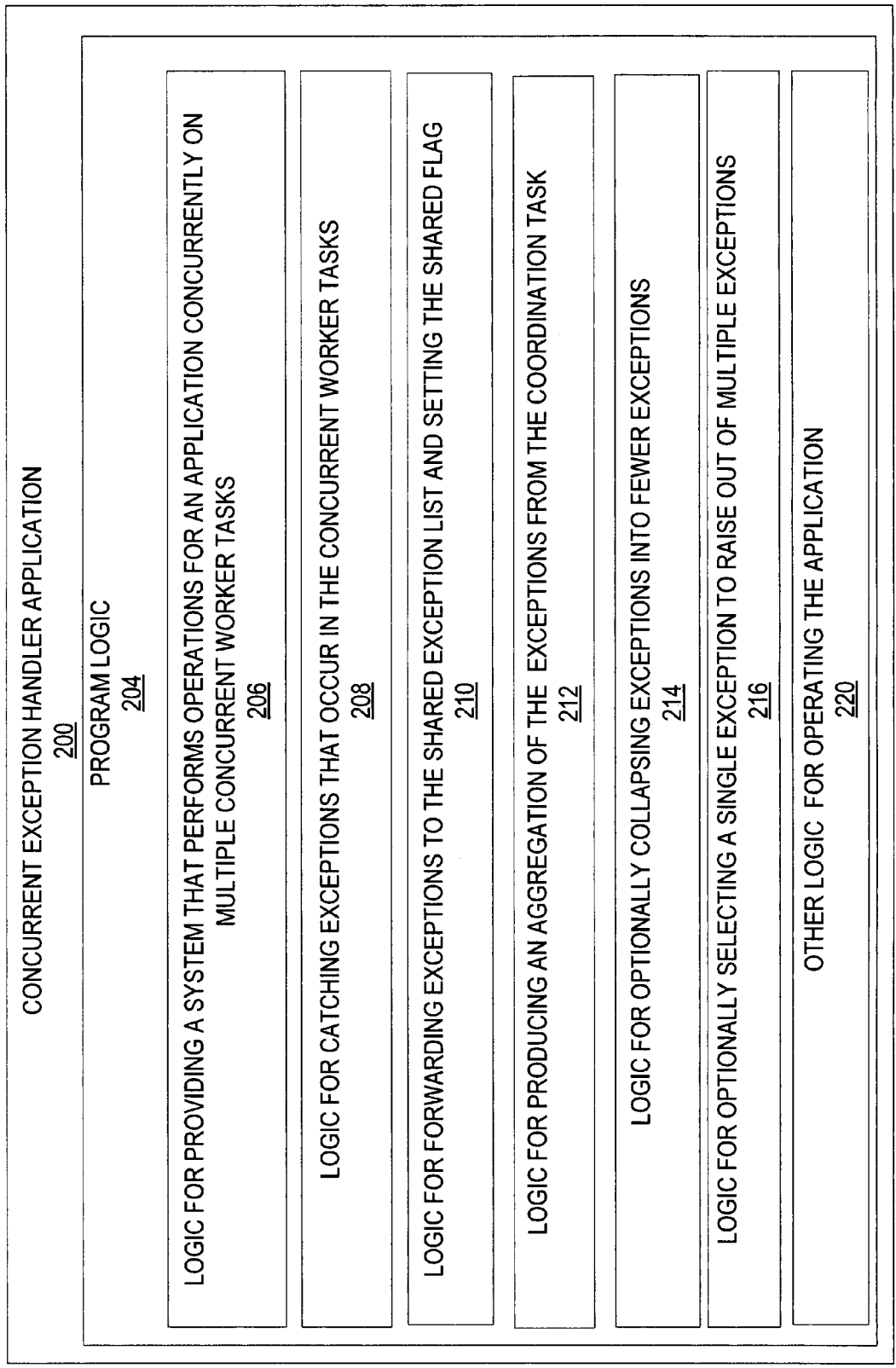
FIG. 2 is a diagrammatic view of a concurrent exception handling application of one implementation operating on the computer system of FIG. 1.

Turning now to FIG. 2 with continued reference to FIG. 1, a concurrent exception handling application 200 operating on computing device 100 is illustrated. Concurrent exception handling application 200 is one of the application programs that reside on computing device 100. However, it will be understood that concurrent exception handling application 200 can alternatively or additionally be embodied as computer-executable instructions on one or more computers and/or in different variations than shown on FIG. 1. Alternatively or additionally, one or more parts of concurrent exception handling application 200 can be part of system memory 104, on other computers and/or applications 115, or other such variations as would occur to one in the computer software art.

Concurrent exception handling application 200 includes program logic 204, which is responsible for carrying out some or all of the techniques described herein. Program logic 204 includes logic for providing a system that performs operations for an application concurrently on multiple concurrent worker tasks 206; logic for catching exceptions that occur in the concurrent tasks 208; logic for forwarding exceptions to the shared exception list and setting the shared flag 210; logic for producing an aggregation of the exceptions from the coordination task 212; logic for optionally collapsing exceptions into fewer exceptions 214; logic for optionally selecting a single exception to raise out of multiple exceptions 216; and other logic for operating application 220. In one implementation, program logic 204 is operable to be called programmatically from another program, such as using a single call to a procedure in program logic 204.

Figure 3:
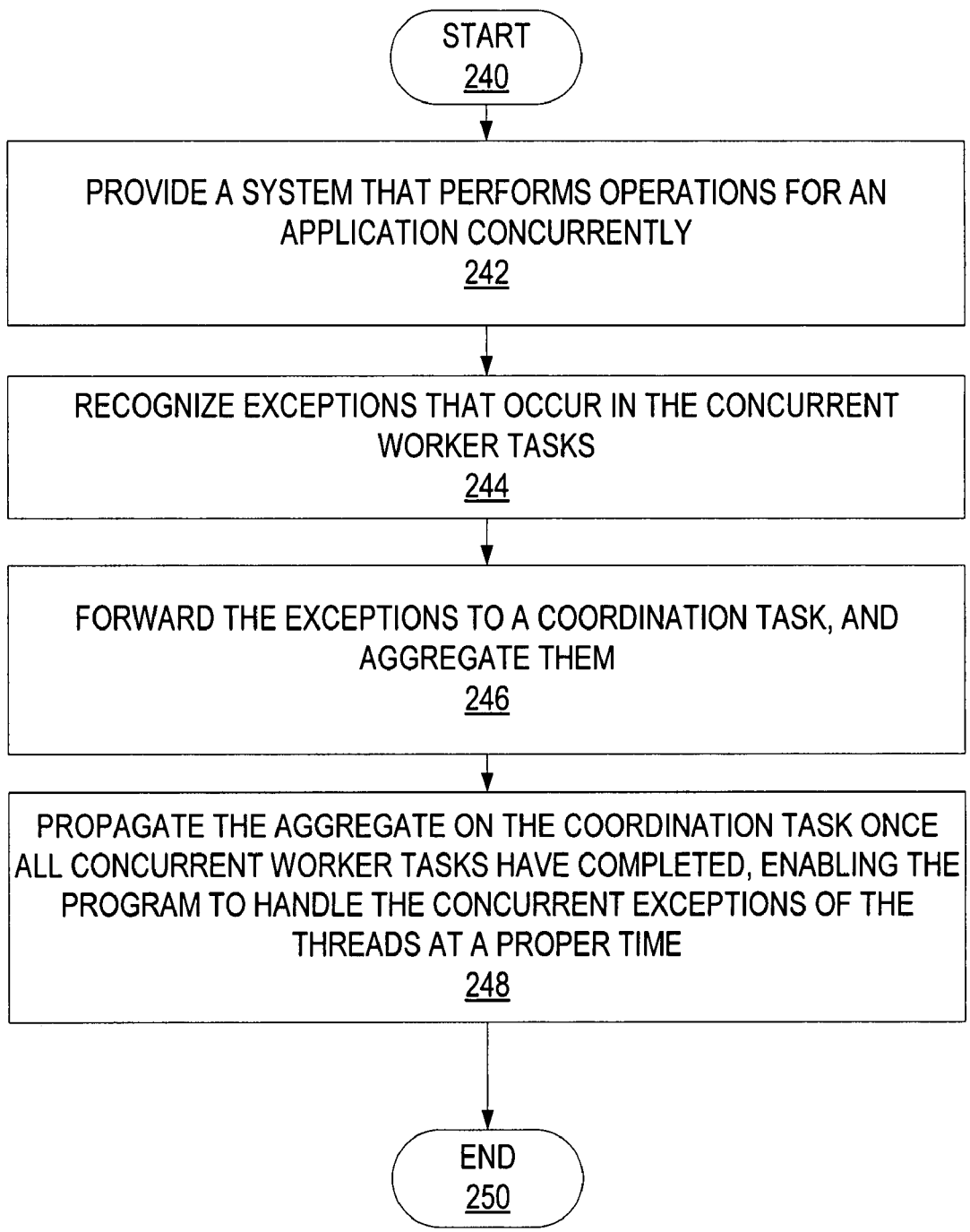
FIG. 3 is a high-level process flow diagram for one implementation of the system of FIG. 1.

Turning now to FIGS. 3-10 with continued reference to FIGS. 1-2, the stages for implementing one or more implementations of concurrent exception handling application 200 are described in further detail. FIG. 3 is a high level process flow diagram for concurrent exception handling application 200. In one form, the process of FIG. 3 is at least partially implemented in the operating logic of computing device 100. The process begins at start point 240 with providing a system that performs operations for an application concurrently (i.e. executing multiple concurrent worker tasks on multiple OS threads) (stage 242). The system recognizes exceptions that occur in the concurrent tasks (stage 244), forwards them to a coordination task, and aggregates them (e.g. in an aggregate exception object or other structure) (stage 246). The system propagates the aggregate from the coordination task once all concurrent worker tasks have completed, enabling the program to handle the concurrent exceptions that happened during the operation at a proper time (stage 248). The logic performed to handle any given exception within the aggregate can be equivalent to the logic it would perform on a sequential program, provided it is capable of recognizing the aggregate exception type and retrieving individual exceptions from within. The process ends at end point 250.

Figure 4:
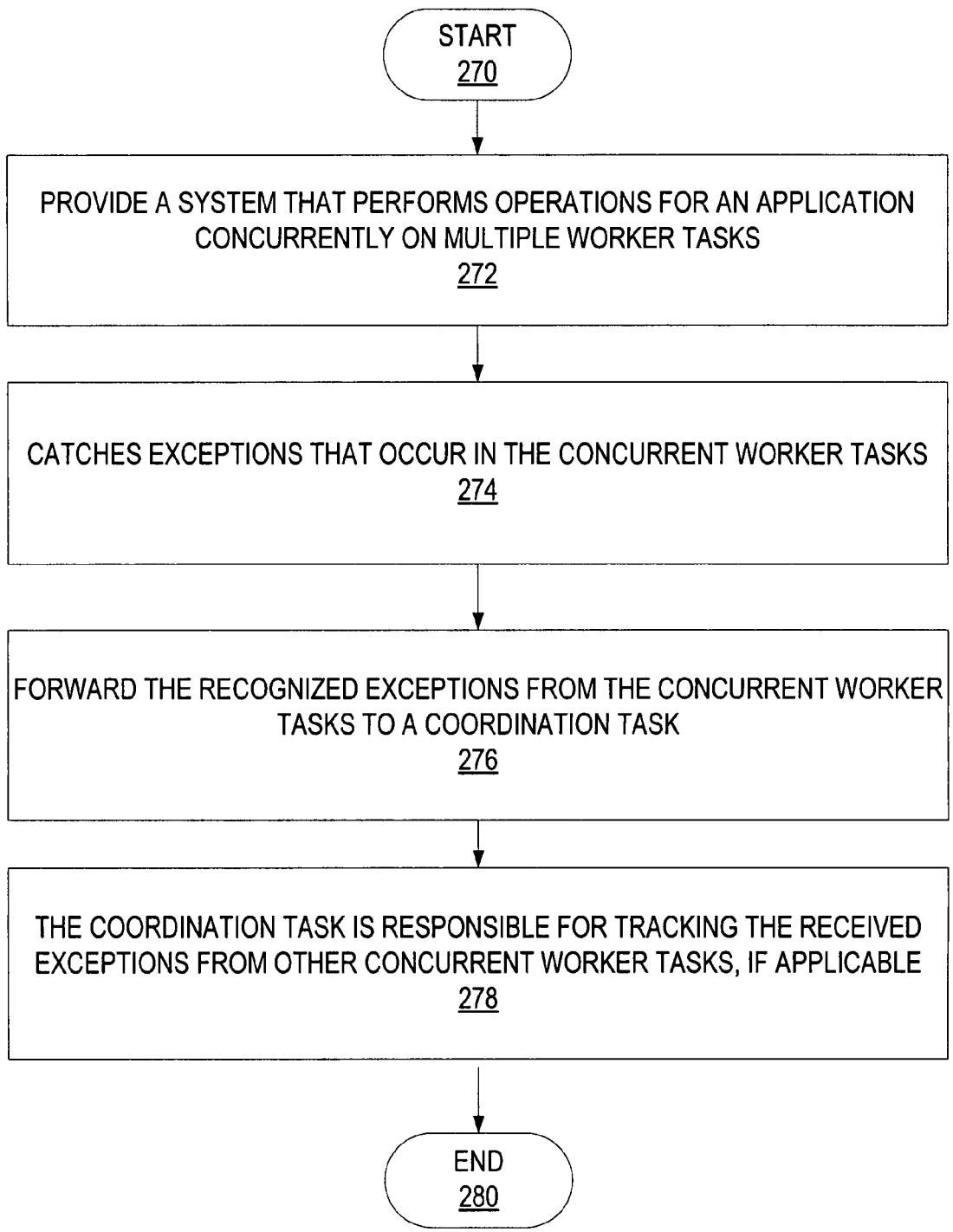
FIG. 4 is a process flow diagram for one implementation of the system of FIG. 1 illustrating the stages involved in catching and forwarding from the concurrent tasks to a coordination task.

FIG. 4 illustrates one implementation of the stages involved in catching and forwarding exceptions from the concurrent worker tasks to a coordination task. In one form, the process of FIG. 4 is at least partially implemented in the operating logic of computing device 100. The process begins at start point 270 with providing a system that performs operations for an application concurrently on multiple worker tasks (e.g. running in separate OS threads) (stage 272). The system catches exceptions that occur in the concurrent worker tasks (stage 274) and forwards the recognized exceptions from the concurrent tasks to a coordination task (stage 276), e.g. by placing them into a shared location. The coordination task is then responsible for tracking the received exceptions from other concurrent worker tasks, if applicable (stage 278). The process ends at end point 280.

Figure 5:
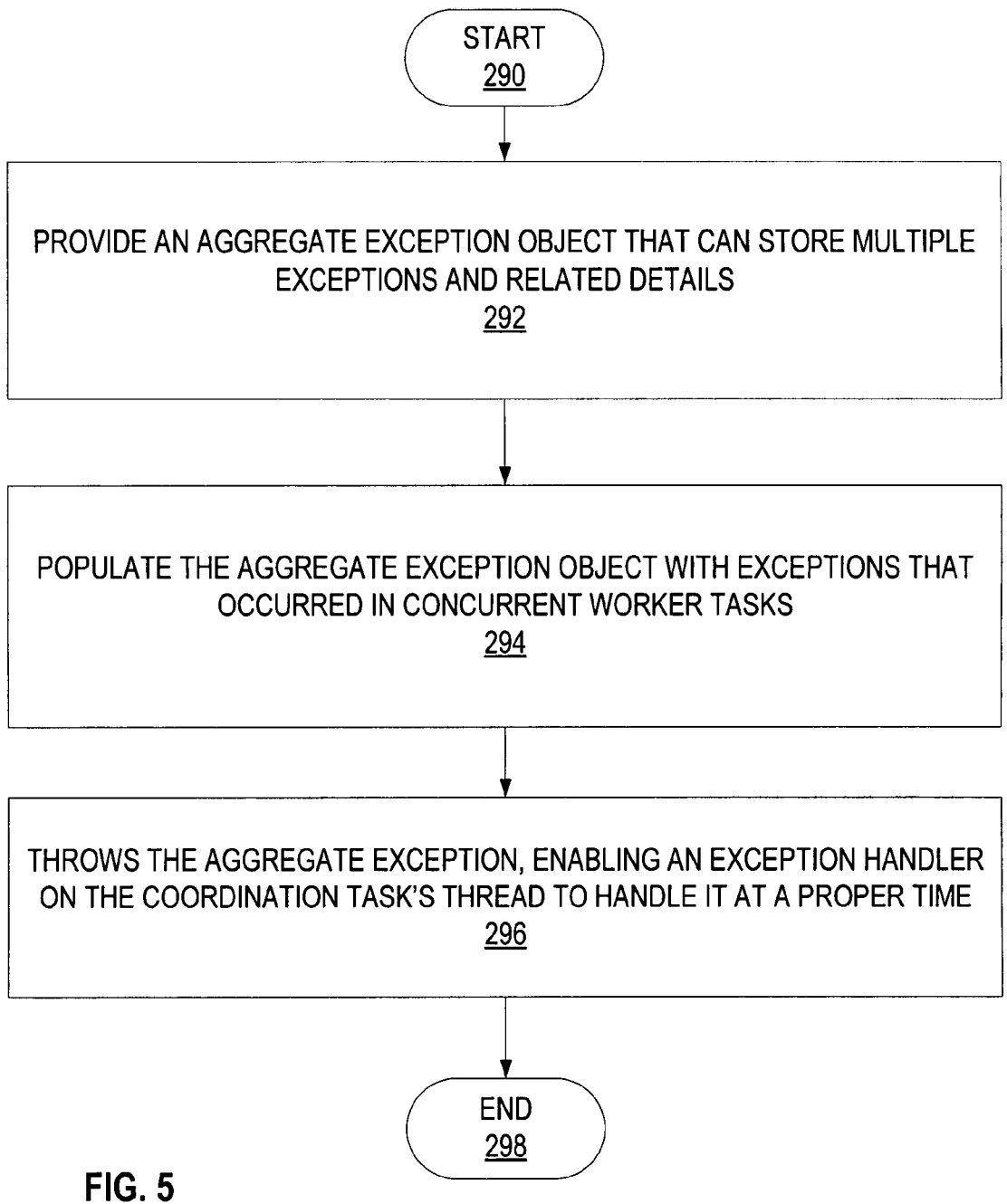
FIG. 5 is a process flow diagram for one implementation of the system of FIG. 1 illustrating the stages involved in aggregating many exceptions into a single aggregate exception object.

FIG. 5 illustrates one implementation of the stages involved in aggregating many exceptions into a single aggregate exception object. In one form, the process of FIG. 5 is at least partially implemented in the operating logic of computing device 100. The process begins at start point 290 with providing an aggregate exception object that can store multiple exceptions and related details (stage 292). In one implementation the aggregate exception object can store the stack trace, thread id, and/or API specific information about the concurrent operations which threw the forwarded exceptions to help debuggability, etc. (stage 292). In other implementations, additional and/or fewer details can be stored. The system populates the aggregate exception object with exceptions that occurred in concurrent worker tasks (optionally in the order in which they were thrown by assigning a global timestamp ordering) (stage 294). The system then throws the aggregate exception, enabling an exception handler in the program to handle it at a proper time (stage 296). The process ends at end point 298.

Figure 6:
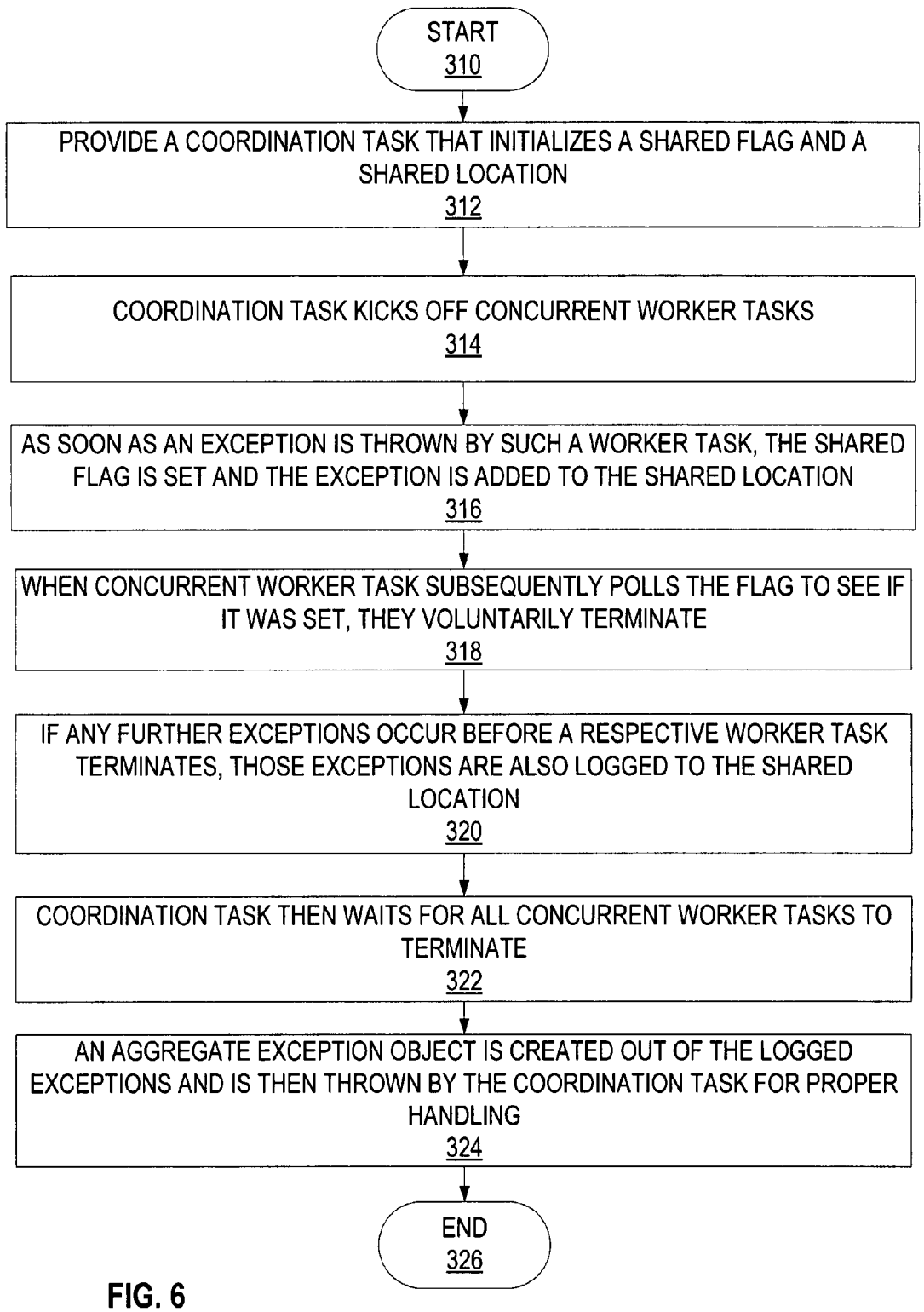
FIG. 6 is a process flow diagram for one implementation of the system of FIG. 1 illustrating the stages involved in terminating concurrent tasks after the first concurrent exception has been thrown.

FIG. 6 illustrates one implementation of the stages involved in terminating concurrent worker tasks after the first concurrent exception has been thrown. In one form, the process of FIG. 6 is at least partially implemented in the operating logic of computing device 100. The process begins at start point 310 with providing a coordination task that initializes a shared flag and a shared location (e.g. a list of exceptions) (stage 312). The coordination task initiates one or more concurrent worker tasks (e.g. by assigning logical units of work called tasks to OS threads, processes, etc.) (stage 314). As soon as an exception is thrown by such a task, the shared flag is set and the exception is added to the shared location (stage 316). When a concurrent worker task subsequently polls the flag to see if it was set, it voluntarily terminates (stage 318). If any further exceptions occur before a respective task terminates, those exceptions are also logged to the shared location (stage 320). The coordination task then waits for all concurrent tasks to terminate (stage 322). An aggregate exception object is created out of the logged exceptions and is then thrown by the coordination task for proper handling (stage 324). In one implementation, an optional mechanism is provided for telling the user which operations completed, which operations threw an exception, and/or which ones were not processed. The process ends at end point 326.

Figure 7:
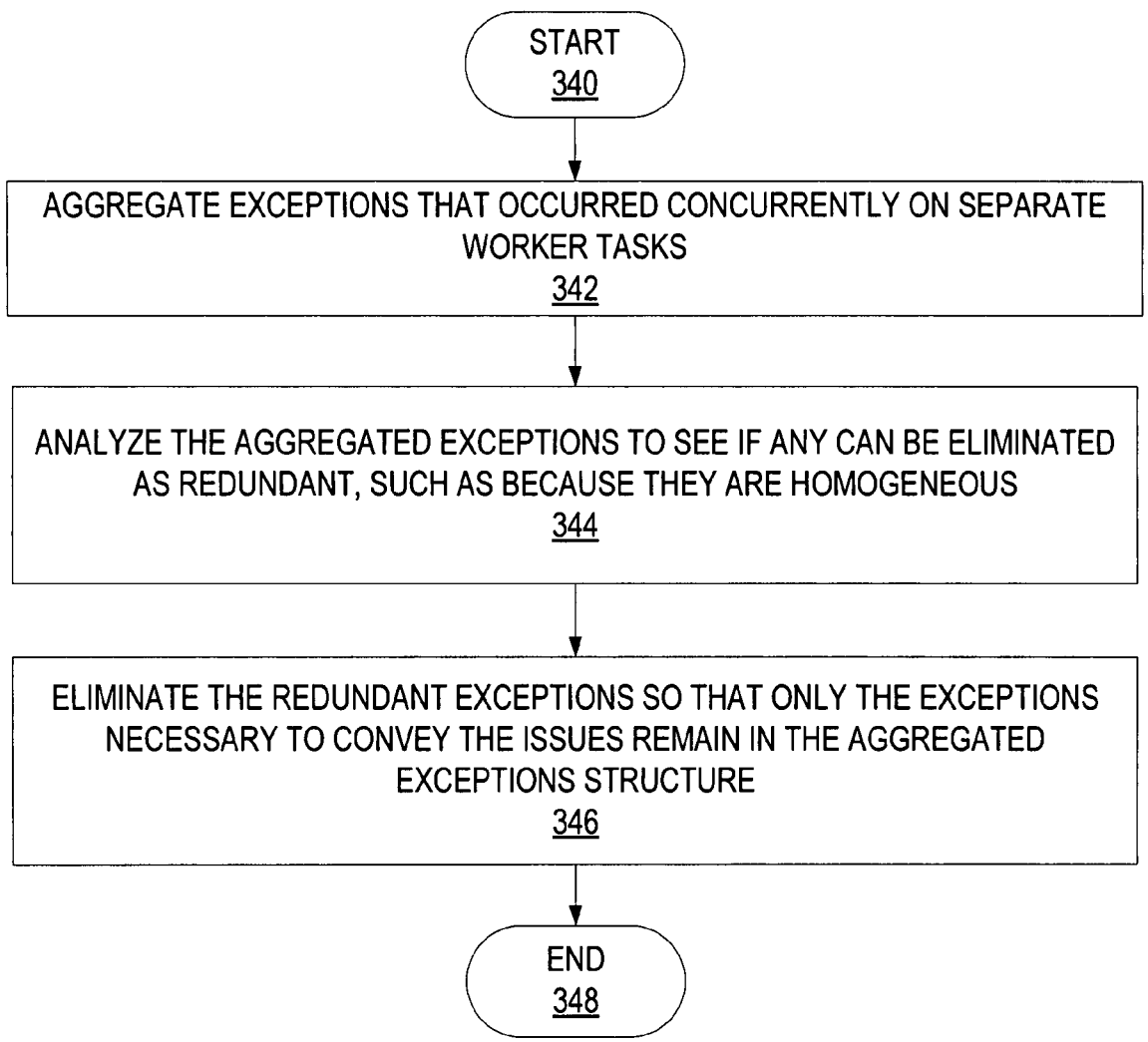
FIG. 7 is a process flow diagram for one implementation of the system of FIG. 1 that illustrates the stages involved in collapsing exceptions that occurred concurrently on separate tasks into fewer exceptions.

FIG. 7 illustrates one implementation of the stages involved in collapsing exceptions that occurred concurrently on separate worker tasks into fewer exceptions. In one form, the process of FIG. 7 is at least partially implemented in the operating logic of computing device 100. The process begins at start point 340 with aggregating exceptions that occurred on separate tasks (stage 342). The aggregated exceptions are analyzed to see if any can be eliminated as redundant, such as because they are homogeneous (i.e. of the same exception type and the same root cause) (stage 344). The system eliminates the redundant exceptions so that only the exceptions necessary to convey the issues remain in the aggregated exceptions structure (stage 346). If all exceptions are homogeneous, an implementation may decide to propagate just one of the exceptions instead of aggregating into an aggregate exception object. The process ends at end point 348.

Figure 8:
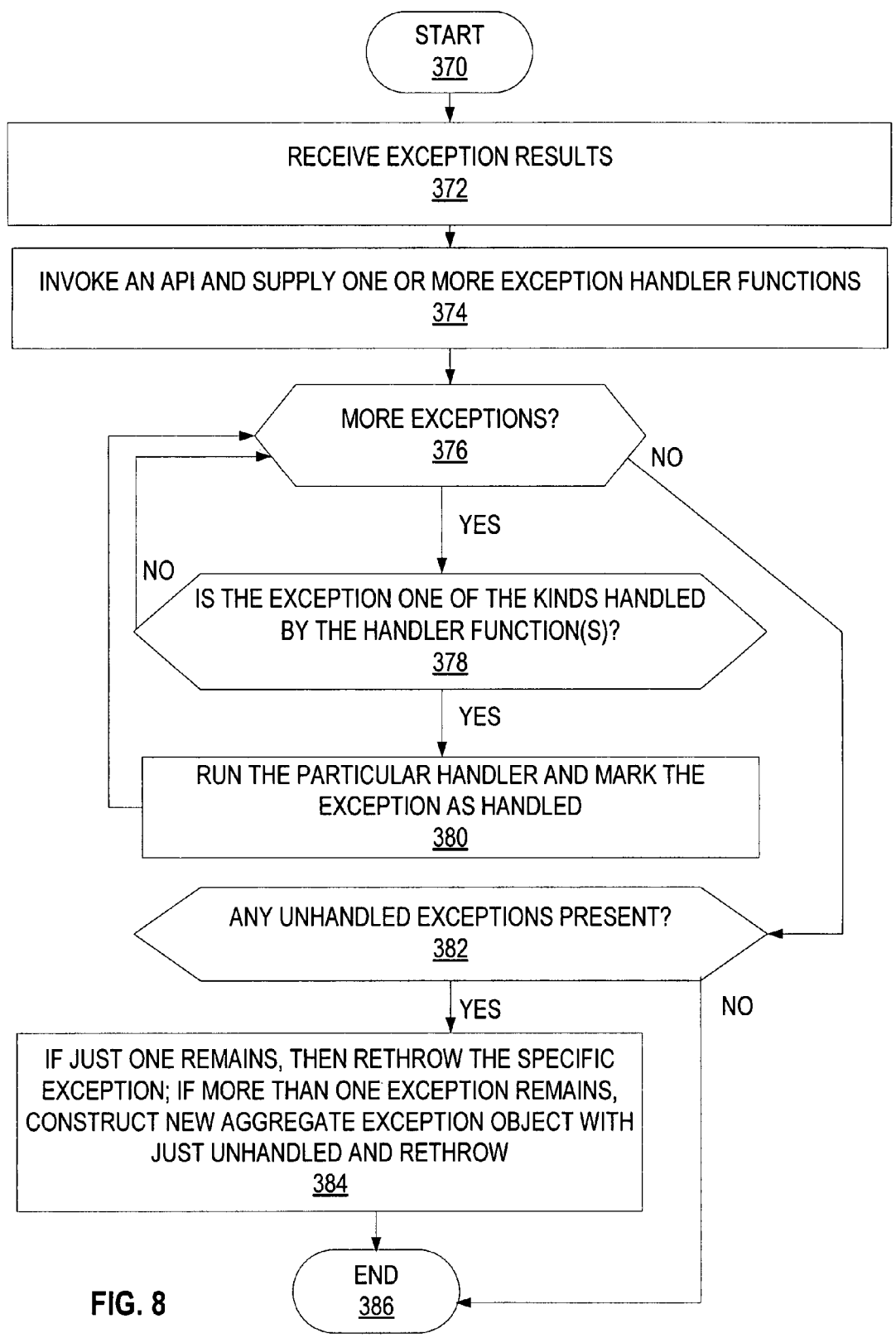
FIG. 8 is a process flow diagram for one implementation of the system of FIG. 1 that illustrates the stages involved in handling multiple exceptions once gathered in the aggregate and rethrown from the coordination task.

FIG. 8 illustrates one implementation of the stages involved in handling multiple exceptions once gathered in the aggregate and rethrown from the coordination task. In one form, the process of FIG. 8 is at least partially implemented in the operating logic of computing device 100. The process begins at start point 370 with receiving exception results (i.e. catching an aggregate exception object that was thrown) (stage 372). The catch handler invokes an API and supplies one or more exception handler functions (stage 374), each of which is comprised of an exception type and a handler function. For each of the exceptions (decision point 376), the system determines if the exception is one of the kinds handled by the handler function(s) (decision point 378). If so, the particular handler is run and the exception is marked as handled (stage 380). Once all of the exceptions are processed to see if there are handlers, the system determines if any unhandled exceptions are still present (decision point 382). If none remain, then the process ends at end point 386. If one exception remains, then the system rethrows the specific exception; if more than one exception remains, a new aggregate exception object is constructed with just the unhandled exceptions and the new aggregate exception object is rethrown (stage 384). The process ends at end point 386.

Figure 9:
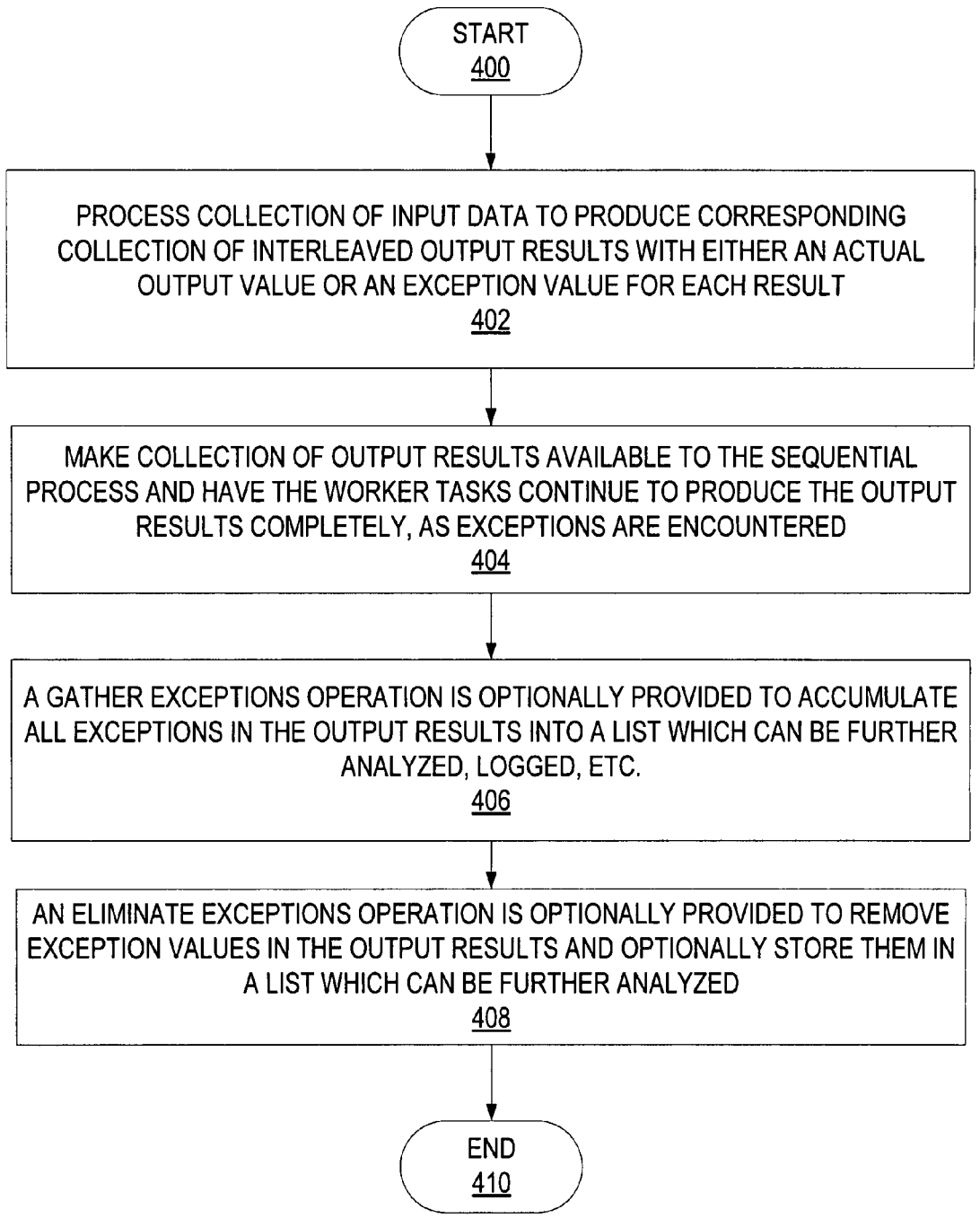
FIG. 9 is a process flow diagram for one implementation of the system of FIG. 1 that illustrates the stages involved in providing a deferred concurrent exception process.

FIG. 9 illustrates one implementation of the stages involved in providing a deferred concurrent exception process. In one form, the process of FIG. 9 is at least partially implemented in the operating logic of computing device 100. The process begins at start point 400 with a sequential process that uses concurrent worker tasks. A collection of input data is processed to produce a corresponding collection of output results (stage 402). The collection contains either an actual output value or an exception value for each result, with the actual output values being interleaved with the exception values (stage 402). In one implementation, the output results can contain the completed results, aggregated exceptions, and/or an indicator that the work was not processed.

In one implementation, as exceptions are interleaved among ordinary output, the system provides the option of preserving the original input ordering in the resulting output. Suppose there is an input of {a, b, c, x, y, z}, and the task is to map elements via some projection function f. The system can provide the capability of ensuring output ordering corresponds to input ordering, such that the results will always be: {f(a), f(b), f(c), f(x), f(y), f(z)}. Similarly, when exceptions are deferred, the system can ensure the resultant exception ends up in the corresponding output element position. If exceptions e1 and e2 happened while executing f(b) and f(y), but all others succeeded, for instance, then the results will be: {f(a), e1, f(c), f(x), e2, f(z)}.

The collection of output results is made available to the sequential process, and the worker tasks continue to produce the output results completely, as exceptions are encountered (stage 404). In one implementation, the output results can then be processed as usual, which causes any exceptions to be rethrown lazily during processing as exceptional output elements are seen. This allows the exceptions to be handled as part of the consumption rather than the production of output. In another implementation, exceptions may be written to the output results first, and then if an exception of a certain type occurs, the operation stopped. For example, if a serious exception occurs that would affect the result of the computation, then it could be better to stop the computation than to continue writing exceptions to the output results.

A gather-exceptions operation is optionally provided to accumulate all exceptions in the output results into a list which can be further analyzed, logged, etc. (stage 406). An eliminate-exceptions operation is optionally provided to remove exception values in the output results and optionally store them in a list which can be further analyzed (stage 408). The process ends at end point 410.

Figure 10:
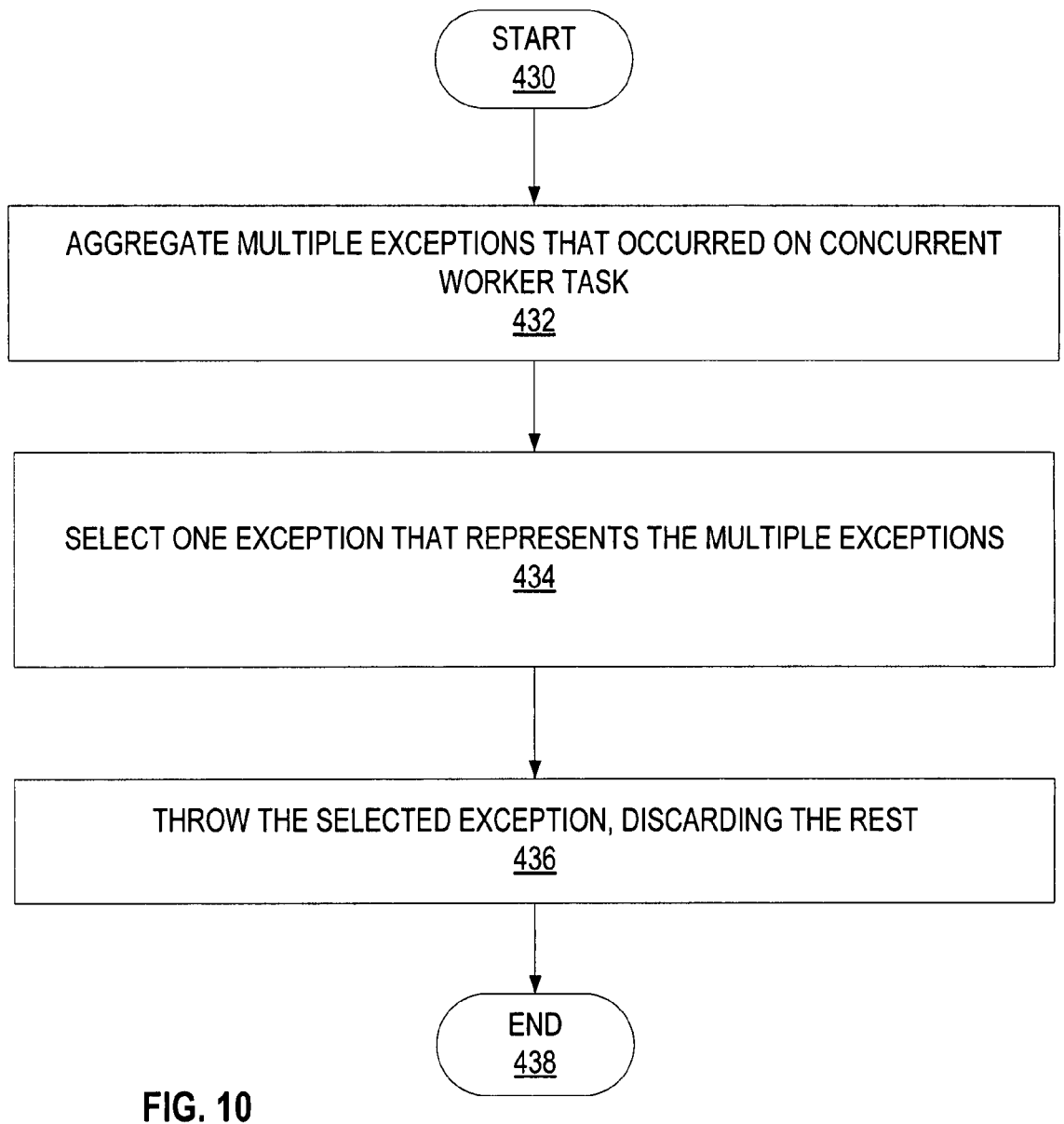
FIG. 10 is a process flow diagram for one implementation of the system of FIG. 1 that illustrates the stages involved in selecting an exception to raise out of many exceptions.

FIG. 10 illustrates one implementation of the stages involved in selecting an exception to raise out of many exceptions. In one form, the process of FIG. 10 is at least partially implemented in the operating logic of computing device 100. The process begins at start point 430 with aggregating multiple exceptions that occurred on concurrent worker tasks (stage 432). The system selects one exception that represents the multiple exceptions (e.g. one that is heuristically determined to be most important, one determined programmatically by a policy, one that was thrown first, etc.) (stage 434). In one implementation, the selected exception is an exception that was not one of the multiple exceptions. In another implementation, the selected exception is selected out of the multiple exceptions as one exception to represent the others because the multiple exceptions all have a same root problem. The system then throws the selected exception (stage 436), discarding the rest. The process ends at end point 438.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer storage medium having computer-executable instructions for causing a computer to perform steps comprising:
   catching exceptions that occur in concurrent worker tasks of a program;
   forwarding the caught exceptions from the concurrent worker tasks to a coordination task;
   aggregating the caught exceptions into an aggregation structure; and
   rethrowing the aggregation structure from the coordination task so that the caught exceptions can be handled by the program at a proper time,
   wherein the caught exceptions are aggregated into the aggregation structure if an unhandled exception occurs on one of the concurrent worker tasks, and
   wherein the proper time for aggregating and rethrowing the caught exceptions in the aggregation structure is when all of the concurrent worker tasks finish executing.

2. The computer storage medium of claim 1, wherein the aggregation structure is an aggregation exception object.

3. The computer storage medium of claim 2, wherein the aggregate exception object is provided to an exception handler so the exceptions can be handled by the program at the proper time.

4. The computer storage medium of claim 1, wherein the coordination task is responsible for tracking the recognized exceptions from the concurrent worker tasks.

5. The computer storage medium of claim 1, wherein one or more of the caught exceptions are removed from the aggregation structure as being redundant exceptions.

6. The computer storage medium of claim 1, wherein the aggregation structure is an output stream that contains concurrent exceptions interleaved with normal output.

7. A method for aggregating many exceptions into a single aggregate exception object comprising the steps of:
   catching exceptions that occur in concurrent worker tasks of a program;
   forwarding the caught exceptions from the concurrent worker tasks to a coordination task;
   aggregating the caught exceptions into a single aggregate exception object; and
   rethrowing the single aggregate exception object from the coordination task so that the caught exceptions can be handled by the program at a proper time,
   wherein the caught exceptions are aggregated into the single aggregate exception object if an unhandled exception occurs on one of the concurrent worker tasks, and
   wherein the proper time for aggregating and rethrowing the caught exceptions in the single aggregate exception object is when all of the concurrent worker tasks finish executing.

8. The method of claim 7, wherein the single aggregate exception object can also store related information about each of the plurality of exceptions.

9. The method of claim 8, wherein the related information includes an identifier of the thread which originally threw the exception.

10. The method of claim 8, wherein the related information includes an original stack trace.

11. The method of claim 8, wherein the related information includes application programming interface specific information about a concurrent operation that resulted in a particular exception.

12. The method of claim 7, wherein the one or more of the plurality of exceptions are removed from the single aggregate exception object as being redundant exceptions.

13. The method of claim 7, wherein the proper time at which the aggregate exception object is provided to the exception handler is after a first exception occurs on one of the concurrent worker tasks.

14. A computer storage medium having computer-executable instructions for causing a computer to perform the steps recited in claim 7.

15. A method for terminating concurrent worker tasks after a first concurrent exception occurs comprising the steps of:
   providing a coordination task that initializes a shared flag and a shared location;
   starting concurrent worker tasks;
   as soon as a first concurrent exception is thrown, setting the shared flag and logging the exception to the shared location;
   when each respective concurrent worker task subsequently polls the shared flag to see if the shared flag was set, the respective task voluntarily terminates;
   if any further exceptions occur before each respective task terminates, logging those further exceptions to the shared location;

waiting for all of the concurrent worker tasks to terminate; and creating an aggregate exception object out of any exceptions logged to the shared location and then throwing the aggregate exception object for proper handling.

16. The method of claim 15, wherein the shared location contains a collection of exceptions.

17. A computer storage medium having computer-executable instructions for causing a computer to perform the steps recited in claim 15.

* * * * *